(12) United States Patent
Kaida et al.

(10) Patent No.: US 9,091,381 B2
(45) Date of Patent: Jul. 28, 2015

(54) SPHERICAL ANNULAR SEAL MEMBER

(75) Inventors: Hidetoshi Kaida, Kanagawa (JP);
Kouhei Kurose, Kanagawa (JP)

(73) Assignee: OILES CORPORATION, Tokyo (JP)

( * ) Notice: Subject to any disclaimer, the term of this patent is extended or adjusted under 35 U.S.C. 154(b) by 143 days.

(21) Appl. No.: 13/816,566

(22) PCT Filed: Jul. 28, 2011

(86) PCT No.: PCT/JP2011/004272
§ 371 (c)(1),
(2), (4) Date: Feb. 12, 2013

(87) PCT Pub. No.: WO2012/023244
PCT Pub. Date: Feb. 23, 2012

(65) Prior Publication Data
US 2013/0147127 A1    Jun. 13, 2013

(30) Foreign Application Priority Data

Aug. 19, 2010  (JP) ................................. 2010-184406
Oct. 1, 2010   (JP) ................................. 2010-223824

(51) Int. Cl.
| F16J 15/12 | (2006.01) |
| F16L 23/18 | (2006.01) |
| F01N 13/18 | (2010.01) |
| F16J 15/08 | (2006.01) |

(52) U.S. Cl.
CPC ............. *F16L 23/18* (2013.01); *F01N 13/1827* (2013.01); *F16J 15/0812* (2013.01); *F16J 15/126* (2013.01)

(58) Field of Classification Search
CPC .............................. F16L 23/18; F01N 13/1827
USPC .................................. 277/611, 627, 650–654
See application file for complete search history.

(56) References Cited

U.S. PATENT DOCUMENTS 3,784,212 A * 1/1974 Doerfling ...................... 277/592
5,135,240 A * 8/1992 Dodson .......................... 277/537
(Continued)

FOREIGN PATENT DOCUMENTS

JP    58-21144    4/1983
JP    04-021509   1/1992
(Continued)

OTHER PUBLICATIONS

International Search Report for PCT/JP2011/004272 mailed Nov. 1, 2011.
(Continued)

*Primary Examiner* — Gilbert Lee
(74) *Attorney, Agent, or Firm* — Nixon & Vanderhye P.C.

(57) ABSTRACT

A spherical annular seal member 34 includes a spherical annular base member 32 defined by a cylindrical inner surface 28, a partially convex spherical surface 29, and annular end faces 30, 31, as well as an outer layer 33 formed integrally on the partially convex spherical surface 29. The spherical annular base member 32 includes a reinforcing member 5 made from a metal wire net 4 and a heat-resistant material 6 containing expanded graphite and a phosphate and integrated with the reinforcing member 5 in mixed form, and the outer layer includes the heat-resistant material 6 containing the expanded graphite and the phosphate and the reinforcing member 5 made from the metal wire net 4 integrated with the heat-resistant material 6 in mixed form, the expanded graphite in the heat-resistant material 6 having an ash content of not more than 0.1% by mass and a graphite content of not less than 99.7% by mass.

12 Claims, 6 Drawing Sheets

(56) References Cited

U.S. PATENT DOCUMENTS

| | | | |
|---|---|---|---|
| 5,698,498 A * | 12/1997 | Luciani et al. | 508/193 |
| 6,747,077 B2 * | 6/2004 | Gugumus et al. | 524/100 |
| 2002/0077394 A1 * | 6/2002 | Gugumus et al. | 524/100 |
| 2006/0287433 A1 * | 12/2006 | Kanae et al. | 525/191 |

FOREIGN PATENT DOCUMENTS

| | | |
|---|---|---|
| JP | 9-317894 | 12/1997 |
| JP | 2001-99325 | 4/2001 |
| JP | 2003-252615 | 9/2003 |
| JP | 2004-301261 | 10/2004 |
| JP | 2005-282623 | 10/2005 |
| JP | 2006-143573 | 6/2006 |
| WO | WO 2009078165 A1 * | 6/2009 |

OTHER PUBLICATIONS

CN Official Action and English translation in CN 201180039714.8 received Oct. 14, 2014.

* cited by examiner

SPHERICAL ANNULAR SEAL MEMBER

This application is the U.S. national phase of International Application No. PCT/JP2011/004272 filed 28 Jul. 2011 which designated the U.S. and claims priority to JP 2010-184406 filed 19 Aug. 2010, and JP 2010-223824 filed 1 Oct. 2010, the entire contents of each of which are hereby incorporated by reference.

TECHNICAL FIELD

The present invention relates to a spherical annular seal member which is suitably used in a spherical pipe joint for an automobile exhaust pipe.

BACKGROUND ART

FIG. 15 shows one embodiment of an exhaust passage of an automobile engine, exhaust gases generated in the respective cylinders (not shown) of the engine are gathered in an exhaust manifold catalyst converter 600 and are sent to a sub muffler 603 through an exhaust pipe 601 and an exhaust pipe 602. The exhaust gases which passed through this sub muffler 603 are further sent to a muffler 606 through an exhaust pipe 604 and an exhaust pipe 605, and are released to the atmosphere through this muffler 606.

Exhaust system members such as these exhaust pipes 601 and 602 as well as 604 and 605, the sub muffler 603, and the muffler 606 are subjected to repeated stress owing to such as the roll behavior and vibration of the engine. Particularly in the case of a high-speed rotation and high-output engine, the stress applied to the exhaust system members becomes quite large. Accordingly, the exhaust system members have a possibility of bringing about a fatigue failure, and the engine vibration can cause the exhaust system members to resonate, thereby deteriorating compartment quietness in some cases. To overcome these problems, a connecting portion 607 between the exhaust manifold catalyst converter 600 and the exhaust pipe 601 and a connecting portion 608 between the exhaust pipe 604 and the exhaust pipe 605 are movably connected by a vibration absorbing mechanism such as an exhaust pipe spherical joint or a bellows type joint, whereby advantages are provided in that the stress is absorbed to which the exhaust system members are repeatedly subjected due to such as the roll behavior and vibration of the automobile engine, thereby preventing the fatigue failure and the like of these exhaust system members and overcoming the problem that the engine vibration causes the exhaust system members to resonate and deteriorates the quietness of the compartment interior.

PRIOR ART DOCUMENTS

Patent Documents

Patent Document 1: JP-B-58-21144
Patent Document 2: JP-A-2001-99325

SUMMARY OF THE INVENTION

Problems to be Solved by the Invention

As one embodiment of the above-described vibration absorbing mechanism, it is possible to cite the exhaust pipe joint described in Patent Document 1. This exhaust pipe joint has advantages in that, in comparison with a bellows type joint, it makes it possible to attain a reduction in the manufacturing cost and excels in durability. However, the seal member used in this exhaust pipe joint is formed such that a heat-resistant material made from expanded graphite and a reinforcing member made from a metal wire net are compressed to fill meshes of the reinforcing member with the heat-resistant material, and the heat-resistant material and the reinforcing member are thereby integrated in mixed form. An expanded graphite sheet used in this seal member is generally manufactured in the following manner. A powder of natural flaky graphite, kish graphite or the like is subjected to oxidation treatment by anodic oxidation or immersion in a mixed acid in which, for instance, nitric acid or the like is added to concentrated sulfuric acid, and this material is washed with water and then dried, followed by a heating and expanding process to produce expanded graphite. The powder of expanded graphite thus obtained is compression molded by a press machine or a rolling machine. This expanded graphite sheet not only excels in chemical resistance, heat resistance, heat insulation, and electrical conductivity, which are the features of graphite, but also has high flexibility and compression recoverability. Therefore, the expanded graphite sheet is widely used as various packing materials and high temperature thermal insulation materials.

However, this expanded graphite sheet contains in large amounts such metallic impurities as silicon (Si) as well as iron (Fe) and aluminum (Al) and such impurities as ash content because its starting material is natural flaky graphite or kish graphite. In addition, since the expanded graphite sheet is manufactured by undergoing immersion in a mixed acid (sulfuric acid:nitric acid=9:1) using concentrated sulfuric acid as a base, the expanded graphite sheet has a drawback in that sulfuric compounds, particularly sulfur (S), remain in large amounts. The expanded graphite sheet containing such sulfuric compounds and the ash content in large amounts can possibly lead to the problems of adversely affecting corrosion resistance and causing a decline in heat resistance and durability.

The conventional seal members have been unable to satisfy the conditions of use in terms of heat resistance, particularly owing to an increase in the exhaust gas temperature due to the improved performance of automobile engines in recent years, and owing to an increase in the exhaust gas temperature attributable to the fact that the spherical pipe joint is located closer to the engine side in the case where the spherical pipe joint is disposed in the vicinity of the aforementioned exhaust manifold catalyst converter for the purpose of improving the noise, vibration and harshness (NVH) characteristics of the automobile. Thus, there has been a compelling need for improvement of the heat resistance of the seal member itself, and further improvement of the heat resistance of the heat-resistant material has been required in view of the above-described viewpoint.

With respect to the above-described demand, the present applicant proposed a seal member which exhibits heat resistance (oxidative wear resistance) even under high temperatures exceeding 600° C. and excels in sealability (refer to Patent Document 2). In this Patent Document 2, a spherical annular seal member is disclosed which is used particularly as an exhaust pipe spherical joint and has a cylindrical inner surface defining a through hole in a central portion thereof, an outer surface formed in the shape of a partially convex spherical surface, and an annular end face on a large-diameter side of the outer surface. In its inner portion extending from the cylindrical inner surface to the outer surface formed in the shape of the partially convex spherical surface, the spherical annular seal member has a reinforcing member made from a compressed metal wire net, as well as a heat-resistant material which contains expanded graphite, phosphorus pentoxide, and a phosphate, fills meshes of the metal wire net of the reinforcing member, and is compressed in such a manner as to be formed integrally with the reinforcing member in mixed form. The outer surface formed in the shape of the partially convex spherical surface is formed into a smooth surface where an outer surface layer of the heat-resistant material containing expanded graphite, phosphorus pentoxide, and the phosphate and the reinforcing member made from the metal wire net and formed integrally with the outer surface layer in mixed form are exposed.

Since, in its inner portion extending from the cylindrical inner surface to the outer surface formed in the shape of the partially convex spherical surface, the aforementioned spherical annular seal member has the reinforcing member made from the compressed metal wire net as well as the heat-resistant material which contains expanded graphite, phosphorus pentoxide, and a phosphate, fills meshes of the metal wire net of the reinforcing member, and is compressed in such a manner as to be formed integrally with the reinforcing member in mixed form, the oxidative wear at high temperatures of the expanded graphite constituting the principal component of the heat-resistant material is reduced even at high temperatures exceeding 600° C. by virtue of the oxidation inhibiting action of the phosphorus pentoxide and the phosphate, with the result that the heat resistance of the spherical annular seal member is improved.

With the spherical annular seal member described in this Patent Document 2, the heat resistance (oxidative wear resistance) is improved over the seal member described in Patent Document 1 by virtue of the oxidation inhibiting action of the phosphorus pentoxide and the phosphate contained in the heat-resistant material, and the amount of weight reduction of the seal member attributable to the oxidative wear of the expanded graphite in the heat-resistant material is substantially remedied. Even with the spherical annular seal member described in this Patent Document 2, however, it is difficult to say to the heat resistance of the heat-resistant material containing the expanded graphite with respect to such as the improvement of the above-described NVH, and further improvement of heat resistance has been required.

As a result of conducting strenuous studies to satisfy the above-described requirement, by making effective use of the oxidation inhibiting action of the phosphorus pentoxide and the phosphate described in the above-described Patent Document 2 with respect to the expanded graphite and by focusing attention on the expanded graphite constituting the principal component of the heat-resistant material, the present inventors found that, by decreasing the contents of metallic impurities, ash, and sulfur contained in the expanded graphite and by increasing the content of graphite (graphite purity), it is possible to further improve the heat resistance of the heat-resistant material itself, with the result that, even in use at high temperatures exceeding 600° C., it is possible to reduce the weight reduction attributable to the oxidative wear of the spherical annular seal member.

The present invention has been devised on the basis of the above-described finding, and its object is to provide a spherical annular seal member which reduces oxidative wear even in the use at high temperatures exceeding 600° C., thereby reducing the weight reduction attributable to the oxidative wear and improving sealing properties.

Means for Solving the Problems

A spherical annular seal member in accordance with the present invention for use in an exhaust pipe joint comprises: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member, wherein the spherical annular base member includes a reinforcing member made from a metal wire net and a heat-resistant material containing expanded graphite and at least a phosphate and compressed in such a manner as to fill meshes of the metal wire net of the reinforcing member and to be integrated with the reinforcing member in mixed form, and the outer layer includes a heat-resistant material containing expanded graphite and at least a phosphate and a reinforcing member made from a metal wire net integrated with the heat-resistant material in mixed form, the expanded graphite in the heat-resistant material having an ash content of not more than 0.1% by mass and a graphite content of not less than 99.7% by mass.

In the present invention, the ash content shall generically refer to a residue (oxides of metallic impurities, including silicon oxide, iron oxide, alumina, etc.) which is obtained by heating expanded graphite and metallic impurities such as iron, calcium, silicon, and aluminum in high-temperature air (1000° C. or thereabouts) and by completely burning the carbon content.

According to the spherical annular seal member in accordance with the present invention, since the expanded graphite constituting the principal component of the heat-resistant material has extremely high purity with an ash content of not more than 0.1% by mass and a graphite content of not less than 99.7% by mass, the heat resistance of the expanded graphite itself is improved. Additionally, as the oxidation inhibiting action of at least a phosphate which is contained therein is added, the oxidative wear in a high-temperature region exceeding 600° C. is inhibited, with the result that the weight reduction of the heat-resistant material ascribable to the oxidative wear is suppressed, thereby making it possible to improve sealing properties.

In the present invention, the expanded graphite in the heat-resistant material may have an ash content of not more than 0.1% by mass and a graphite content of not less than 99.8% by mass.

In the spherical annular seal member in accordance with the present invention, the expanded graphite in the heat-resistant material has an ash content of, preferably, not more than 0.05% by mass, more preferably not more than 0.01% by mass.

Since the ash which is contained in the expanded graphite of the heat-resistant material serves as an impurity for the expanded graphite, the lesser the ash content, the more the characteristics which the expanded graphite itself has, such as the heat resistance and flexibility, are improved, so that, it is essentially desirable that the content be 0 (zero). However, since expensive processing cost is required in order to set the content to zero, from the viewpoint of clearing the conditions which are required of the spherical annular seal member, particularly heat resistance (inhibition of oxidative wear), its content is not more than 0.1% by mass, and most preferably not more than 0.01% by mass.

In the spherical annular seal member in accordance with the present invention, the expanded graphite in the heat-resistant material may contains sulfur at a ratio of not more than 1700 ppm by mass, preferably not more than 1000 ppm by mass, more preferably not more than 500 ppm by mass, even more preferably not more than 100 ppm by mass, and still more preferably not more than 50 ppm by mass.

Sulfur is contained as residual sulfur in the process of manufacturing expanded graphite. Here, a description will be given of the method of manufacturing expanded graphite.

While concentrated sulfuric acid of a 98% concentration is being agitated, a 60% aqueous solution of hydrogen peroxide is added to it as an oxidizing agent, and this solution is used as a reaction solution. This reaction solution is cooled and kept at a temperature of 10° C., natural flake graphite powder having a particle size of 30 to 80 meshes is added to the reaction solution, and reaction is allowed to take place for several tens of minutes. Subsequently, acid-treated graphite is separated by suction filtration, and a cleaning operation is repeated twice in which the acid-treated graphite is agitated in water for tens of minutes and is then subjected to suction filtration, thereby sufficiently removing the sulfuric acid content from the acid-treated graphite. Then, the acid-treated graphite with the sulfuric acid content sufficiently removed is dried for several hours in a drying furnace held at a temperature of 110° C., and this is used as an acid-treated graphite material. This acid-treated graphite material is subjected to treatment for 5 seconds at a temperature 1000° C. in a furnace to produce cracked gas. The gaps between graphite layers are expanded by its gas pressure to manufacture expanded graphite particles (expansion rate: 240 times). These expanded graphite particles are subjected to compression forming or roll forming, thereby fabricating an expanded graphite sheet having a desired thickness.

In the above-described manufacturing process, an oxidizing solvent such as sulfuric acid, nitric acid, and a mixed acid of sulfuric acid and nitric acid is used at the time of the fabrication of acid-treated graphite. In a case where nitric acid is used as this oxidizing solvent, residual sulfur is not produced in the expanded graphite, but the productivity of the acid-treated graphite material is poor, so that it is necessary to use sulfuric acid or a mixed acid of sulfuric acid and nitric acid under present circumstances, and therefore residual sulfur is bound to be contained in the acid-treated graphite thus obtained.

In cases where the expanded graphite containing this residual sulfur is used in, for instance, sealing members (seals, packings, etc.) and sliding members (bearings etc.), heat resistance is not affected, but there is the problem of corrosion induced by the residual sulfur. The degree of corrosion due to this residual sulfur varies depending on the relative content of the residual sulfur, but according to experiments conducted by the present inventors it was confirmed that the defect due to corrosion is not produced if the content is not more than 1700 ppm by mass (not more than 0.17% by mass), and still more so if the content is not more than 1000 ppm by mass. Since this sulfur also serves as an impurity for the expanded graphite in the same way as the aforementioned ash, the lesser the sulfur content, the more the aforementioned characteristics which the expanded graphite itself has are improved, so that, it is essentially desirable that the content be 0 (zero). However, since it is industrially difficult to set the residual sulfur to zero, from the viewpoint of the conditions which are required of the spherical annular seal member, particularly heat resistance, its content is not more than 1700 ppm by mass, preferably not more than 1000 ppm by mass, more preferably not more than 500 ppm by mass, even more preferably not more than 100 ppm by mass, and the most preferably not more than 50 ppm by mass.

In the spherical annular seal member in accordance with the present invention, the heat-resistant material contains at least a phosphate at a ratio of 0.1 to 16% by mass, preferably 0.5 to 8% by mass.

The phosphate contained in the expanded graphite of the heat-resistant material exhibits the action of inhibiting the oxidative wear of expanded graphite at a high temperature. The phosphate may be selected from lithium primary phosphate ($LiH_2PO_4$), lithium secondary phosphate ($Li_2HPO_4$), calcium primary phosphate [$Ca(H_2PO_4)_2$], calcium secondary phosphate ($CaHPO_4$), aluminum primary phosphate [$Al(H_2PO_4)_3$], and aluminum secondary phosphate [$Al_2(HPO_4)_3$].

The heat-resistant material may further contain 0.05 to 5% by mass, preferably 0.5 to 3% by mass, of phosphorus pentoxide which, in conjunction with the aforementioned phosphate, exhibits the action of inhibiting the oxidative wear of expanded graphite at a high temperature. The phosphorus pentoxide is selected from orthophosphoric acid ($H_3PO_4$), metaphosphoric acid ($HPO_3$), polyphosphoric acid, specifically chain condensed phosphoric acids such as pyrophosphoric acid ($H_4P_2O_7$) and tripolyphosphoric acid ($H_5P_3O_{10}$), and polymetaphosphoric acid, specifically cyclic condensed phosphoric acids such as trimetaphosphoric acid and tetrametaphosphoric acid. The phosphorus pentoxide is generally used in the form of an aqueous solution together with an acidized graphite powder at the time of the fabrication of the above-described expanded graphite, and each of these phosphoric acids is contained in the expanded graphite in the form of phosphorus pentoxide ($P_2O_5$) through the dehydration reaction of the phosphoric acid.

In the spherical annular seal member in accordance with the present invention, the outer surface of the outer layer formed integrally on the partially convex spherical surface of the spherical annular seal member may be formed into a smooth surface of the heat-resistant material containing the expanded graphite and the phosphate or the phosphate and the phosphorus pentoxide. In addition, the outer surface of the outer layer may be formed into a smooth surface where a surface constituted by the reinforcing member and a surface of the heat-resistant material containing the expanded graphite and the phosphate or the phosphate and the phosphorus pentoxide are present in mixed form.

The outer surface of the outer layer formed integrally on the partially convex spherical surface of this spherical annular seal member is a portion serving as both a sliding surface and a sealing surface with respect to a mating member of the spherical pipe joint. In particular, from the view point of inhibiting the formation of an excessive film of the heat-resistant material on the surface of the mating member and causing smooth sliding on the surface of the mating member in the sliding contact with the mating member, the outer surface of the outer layer is preferably formed a smooth surface of the latter case where a surface constituted by the reinforcing member and a surface constituted by the heat-resistant material are present in mixed form.

Advantages of the Invention

According to the present invention, the spherical annular seal member is comprised of: a spherical annular base member defined by a cylindrical inner surface, a partially convex spherical surface, and large- and small-diameter side annular end faces of the partially convex spherical surface; and an outer layer formed integrally on the partially convex spherical surface of the spherical annular base member. The spherical annular base member includes a reinforcing member made from a metal wire net and a heat-resistant material containing expanded graphite and a phosphate or a phosphate and phosphorus pentoxide and compressed in such a manner as to fill meshes of the metal wire net of the reinforcing member and to be integrated with the reinforcing member in mixed form. The outer layer includes a heat-resistant material containing expanded graphite and a phosphate or a phosphate and phosphorus pentoxide and a reinforcing member made from a metal wire net integrated with the heat-resistant material in mixed form, the expanded graphite in the heat-resistant material having an ash content of not more than 0.1% by mass and a graphite content of not less than 99.7% by mass, or a graphite content of not less than 99.8% by mass in another aspect. As such, since the graphite purity of the expanded graphite in the heat-resistant material is heightened, the heat resistance of the expanded graphite itself is improved, and since the oxidation inhibiting action due to the phosphate or the phosphate and phosphorus pentoxide is added to it, the oxidative wear of the heat-resistant material at a high temperature is reduced. In consequence, it is possible to provide a spherical annular seal member which reduces the weight reduction of the heat-resistant material ascribable to the oxidative wear and is thereby capable of improving the sealing properties.

MODE FOR CARRYING OUT THE INVENTION

Figure 1:
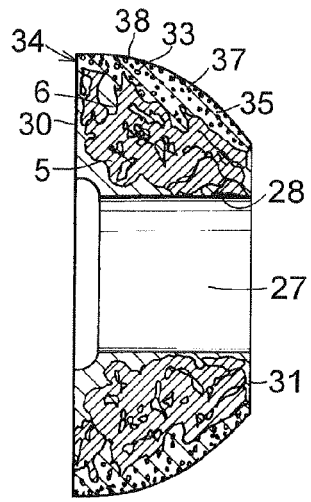
FIG. 1 is a vertical cross-sectional view of a spherical annular seal member which is manufactured in one embodiment of the present invention.

Next, a more description will be given of the present invention on the basis of the preferred embodiment illustrated in the drawings. It should be noted that the present invention is not limited to the embodiment.

A description will be given of the spherical annular seal member on the basis of its manufacturing process.

Figure 3:
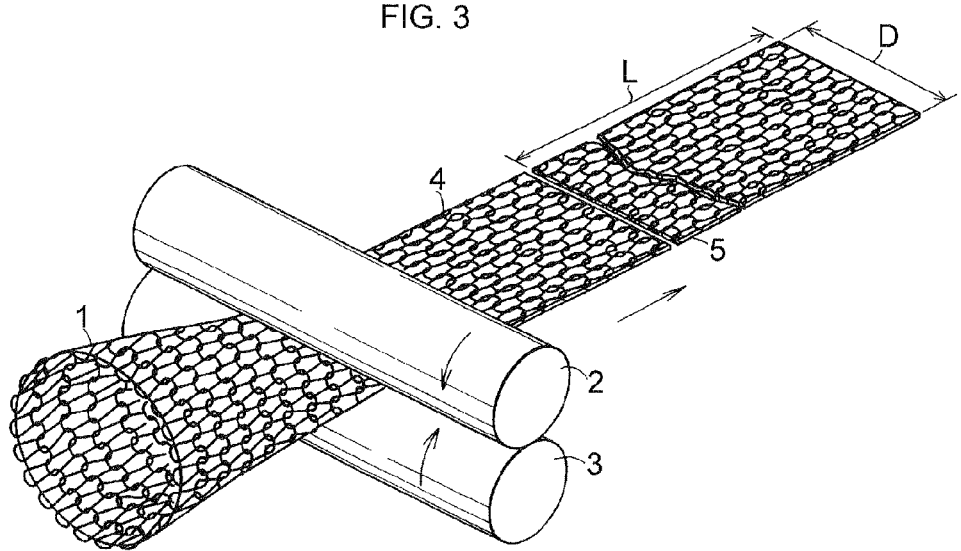
FIG. 3 is a diagram explaining a method of forming a reinforcing member in a process of manufacturing the spherical annular seal member in accordance with the present invention.
Figure 5:
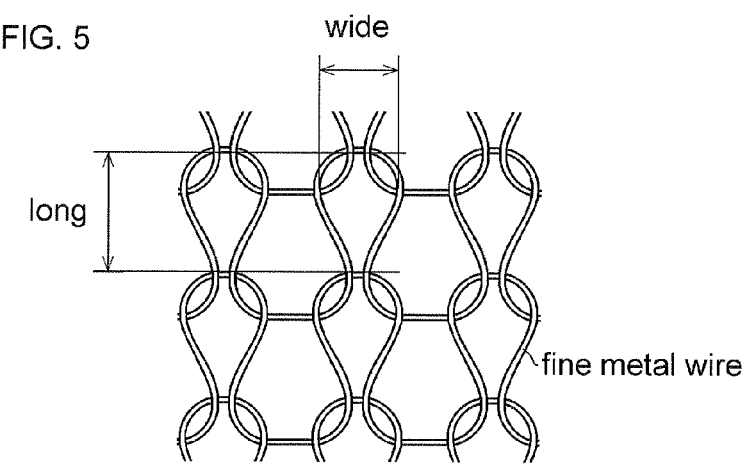
FIG. 5 is a plan view illustrating meshes of a metal wire net of the reinforcing member.

(First Process) As shown in FIG. 3, a hollow cylindrical knitted metal wire net 1, which is formed by knitting a fine metal wire with a diameter of 0.28 to 0.32 mm into a cylindrical shape and whose mesh size is 4 to 6 mm long and 3 to 5 mm wide or thereabouts (see FIG. 5), is passed between rollers 2 and 3, thereby fabricating a belt-shaped metal wire net 4 having a predetermined width D. A reinforcing member 5 is then prepared by cutting the belt-shaped metal wire net 4 into a predetermined length L.

Figure 4:
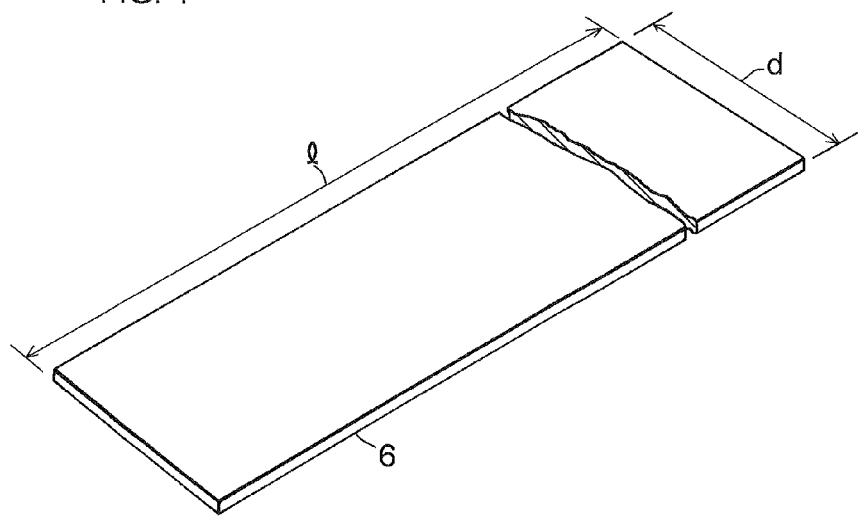
FIG. 4 is a perspective view of a heat-resistant material in the process of manufacturing the spherical annular seal member in accordance with the present invention.

(Second Process) As shown in FIG. 4, a heat-resistant material 6 is prepared which has a width d of (1.10 to 2.10)×D with respect to the width D of the reinforcing member 5 and a length l of (1.30 to 2.70)×L with respect to the length L of the reinforcing member 5 and whose density is 1.0 to 1.15 Mg/m³ or thereabouts and whose thickness is 0.30 to 0.60 mm or thereabouts. The heat-resistant material 6 contains expanded graphite and a predetermined amount of a phosphate or predetermined amounts of a phosphate and phosphorus pentoxide.

Figure 6:
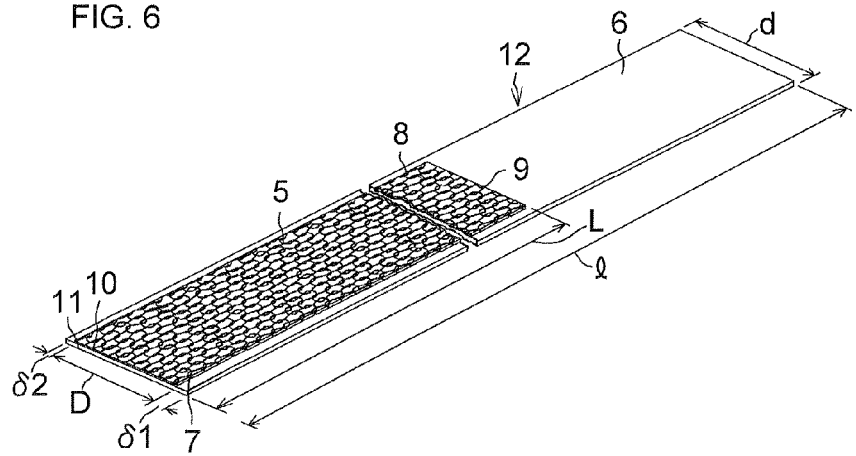
FIG. 6 is a perspective view of a superposed assembly in the process of manufacturing the spherical annular seal member in accordance with the present invention.

(Third Process) A superposed assembly 12 in which the heat-resistant material 6 and the reinforcing member 5 are superposed one on top of the other is prepared as follows: To ensure that the heat-resistant material 6 is wholly exposed on a large-diameter side annular end face 30 of a partially convex spherical surface 29 in a below-described spherical annular seal member 34 (see FIG. 1), as shown in FIG. 6, the heat-resistant material 6 is made to project in the widthwise direction by a maximum of (0.10 to 0.80)×D from one widthwise end 7 of the reinforcing member 5, which serves as the large-diameter side annular end face 30 of the partially convex spherical surface 29. Also, the amount of widthwise projection, δ1, of the heat-resistant material 6 from the end 7 is made greater than the amount of its widthwise projection, δ2, from the other widthwise end 8 of the reinforcing member 5, which serves as a small-diameter side annular end face 31 of the partially convex spherical surface 29. Further, the heat-resistant material 6 is made to project in the longitudinal direction by a maximum of (0.30 to 1.70)×L mm from one longitudinal end 9 of the reinforcing member 5, and the other longitudinal end 10 of the reinforcing member 5 and a longitudinal end 11 of the heat-resistant material 6 corresponding to that end 10 are made to agree with each other.

Figure 7:
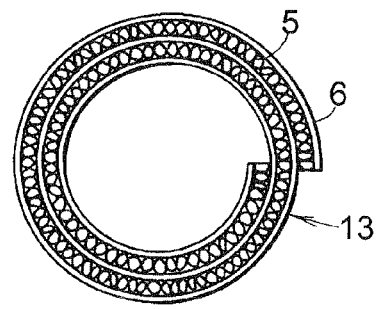
FIG. 7 is a plan view of a tubular base member in the process of manufacturing the spherical annular seal member in accordance with the present invention.
Figure 8:
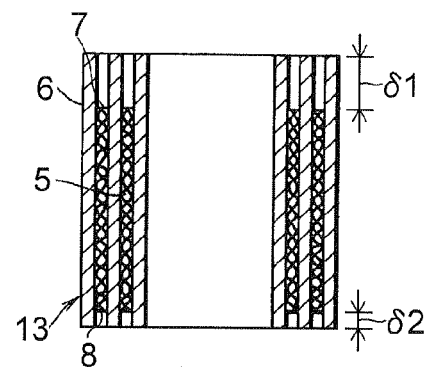
FIG. 8 is a vertical cross-sectional view of the tubular base member shown in FIG. 7.

(Fourth Process) As shown in FIG. 7, the superposed assembly 12 is convoluted with the heat-resistant material 6 placed on the inner side such that heat-resistant material 6 is convoluted with one more turn, thereby forming a tubular base member 13 in which the heat-resistant material 6 is exposed on both the inner peripheral side and the outer peripheral side. As the heat-resistant material 6, one is prepared in advance which has a length l of from 1.30×L to 2.70×L with respect to the length L of the reinforcing member 5 so that the number of winding turns of the heat-resistant material 6 in the tubular base member 13 becomes greater than the number of winding turns of the reinforcing member 5. In the tubular base member 13, as shown in FIG. 8, the heat-resistant material 6 on its one widthwise end side projects in the widthwise direction by δ1 from the one end 7 of the reinforcing member 5, and the heat-resistant material 6 on its other widthwise end side projects in the widthwise direction by δ2 from the other end 8 of the reinforcing member 5.

Figure 9:
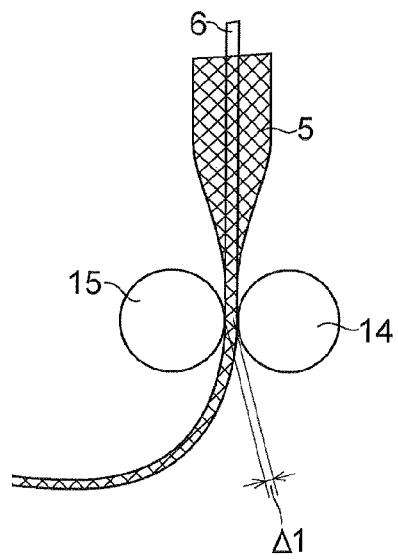
FIG. 9 is a diagram explaining a method of fabricating an outer-layer forming member in the process of manufacturing the spherical annular seal member in accordance with the present invention.
Figure 10:
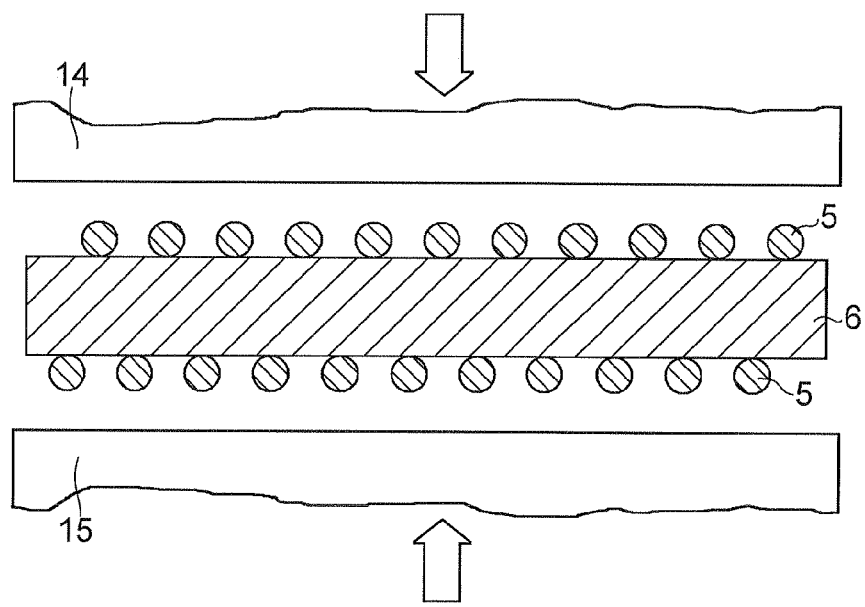
FIG. 10 is a diagram explaining the method of fabricating the outer-layer forming member in the process of manufacturing the spherical annular seal member in accordance with the present invention.
Figure 11:
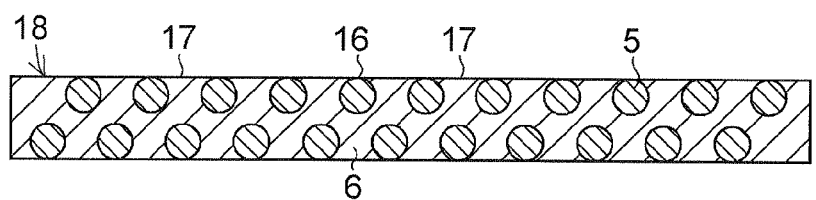
FIG. 11 is a cross-sectional view of the outer-layer forming member in the process of manufacturing the spherical annular seal member in accordance with the present invention.

(Fifth Process) A heat-resistant material 6 similar to the heat-resistant material 6 shown in FIG. 4 is continuously inserted into the interior of the reinforcing member 5 for an outer layer constituted by the hollow cylindrical knitted metal wire net 1 formed by continuously knitting a fine metal wire with a wire diameter of 0.15 to 0.28 mm by a knitting machine (not shown) (see FIG. 9). The reinforcing member 5 with the heat-resistant material 6 inserted therein is fed, starting with its insertion start end side, into a nip Δ1 between a pair of cylindrical rollers 14 and 15 each having a smooth cylindrical outer peripheral surface, and is pressurized in the thicknesswise direction of the heat-resistant material 6 (see FIG. 10) so as to be formed integrally, thereby filling the heat-resistant material 6 into the meshes of the metal wire net of the reinforcing member 5 for the outer layer. Thus, a flattened outer-layer forming member 18 (see FIG. 11) is fabricated on the surface of which a surface 16 constituted by the reinforcing member 5 for the outer layer and a surface 17 constituted by the heat-resistant material 6 are exposed in mixed form.

Figure 12:
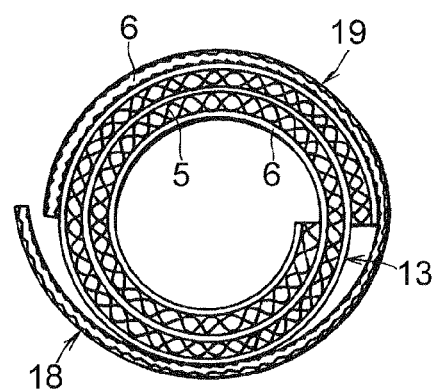
FIG. 12 is a plan view of a cylindrical preform in the process of manufacturing the spherical annular seal member in accordance with the present invention.

(Sixth Process) The outer-layer forming member 18 thus obtained is wound around an outer peripheral surface of the aforementioned tubular base member 13, thereby fabricating a cylindrical preform 19 as shown in FIG. 12.

Figure 13:
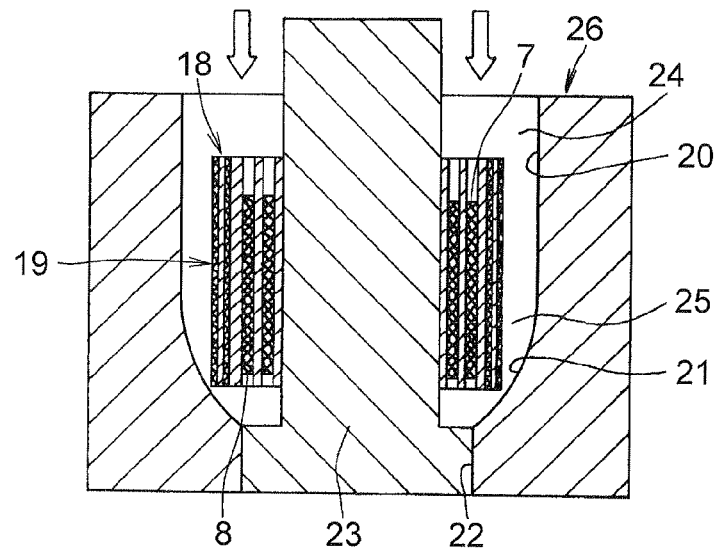
FIG. 13 is a vertical cross-sectional view illustrating a state in which the cylindrical preform is inserted in a die in the process of manufacturing the spherical annular seal member in accordance with the present invention.

(Seventh Process) A die 26 such as the one shown in FIG. 13 is prepared which has on its inner surface a cylindrical inner wall surface 20, a partially concave spherical wall surface 21 continuing from the cylindrical inner wall surface 20, and a through hole 22 continuing from the partially concave spherical wall surface 21, and in which a hollow cylindrical portion 24 and a spherical annular hollow portion 25 continuing from the hollow cylindrical portion 24 are formed inside it as a stepped core 23 is fittingly inserted in the through hole 22. Then, the cylindrical preform 19 is fitted over an outer peripheral surface of the stepped core 23 of the die 26.

Figure 2:
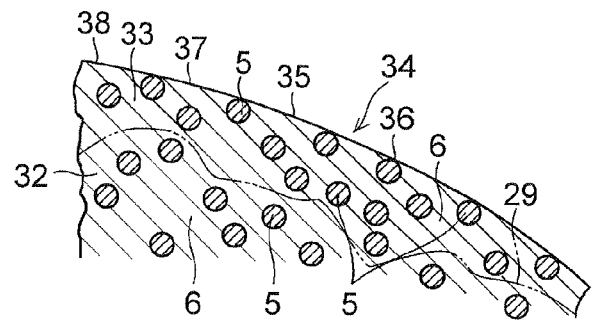
FIG. 2 is a partially enlarged cross-sectional view of the spherical annular seal member shown in FIG. 1.

The cylindrical preform 19 disposed in the hollow cylindrical portion 24 and the spherical annular hollow portion 25 of the die 26 is subjected to compression forming under a pressure of 98 to 294 N/mm$^2$ (1 to 3 tons/cm$^2$) in the direction of the core axis. Thus, the spherical annular seal member 34 is fabricated which includes a spherical annular base member 32 having a through hole 27 in its central portion and defined by a cylindrical inner surface 28, the partially convex spherical surface 29, and the large- and small-diameter side annular end faces 30 and 31 of the partially convex spherical surface 29, as well as an outer layer 33 formed integrally on the partially convex spherical surface 29 of the spherical annular base member 32, as shown in FIGS. 1 and 2.

By means of this compression forming, the spherical annular base member 32 is constructed so as to be provided with structural integrity as the heat-resistant material 6 and the reinforcing member 5 are compressed to each other and intertwined with each other. In the outer layer 33, the heat-resistant material 6 and the reinforcing member 5 made from the metal wire net are compressed such that the heat-resistant material 6 is filled in the meshes of the metal wire net of the reinforcing member 5, and the heat-resistant material 6 and the reinforcing member 5 are integrated in mixed form, an outer surface 35 of that outer layer 33 being thus formed into a smooth surface 38 in which a surface 36 constituted by the reinforcing member 5 and a surface 37 constituted by the heat-resistant material 6 are present in mixed form.

In the spherical annular base member 32 and the outer layer 33 of the fabricated spherical annular seal member 34, the reinforcing member 5 constituted by the metal wire net is contained at a ratio of 40 to 65% by mass, and the heat-resistant material 6 is contained at a ratio of 35 to 60% by mass. The heat-resistant material 6 in the spherical annular base member 32 and the outer layer 33 has a density of 1.20 to 2.00 Mg/m$^3$.

In addition, if attention is focused on the outer layer 33 alone, the reinforcing member 5 constituted by the metal wire net is contained at a ratio of 60 to 75% by mass, and the heat-resistant material 6 is contained at a ratio of 25 to 40% by mass in the outer layer 33.

In the above-described fifth process, as the flattened outer-layer forming member 18, it is possible to use a sheet member which is formed by superposing the heat-resistant material 6 and the reinforcing member 5 obtained by cutting the aforementioned belt-shaped metal wire net 4 to the predetermined length L and by subjecting the two members to compression forming in the thicknesswise direction, whereby the heat-resistant material 6 and the reinforcing member 5 are compressed such that the heat-resistant material 6 is filled in the meshes of the metal wire net of the reinforcing member 5, and only the heat-resistant material 6 is exposed on one surface, while only the reinforcing member 5 is exposed on the other surface. In this case, the spherical annular seal member 34 may be fabricated as follows: In the above-described sixth process, this sheet member is convoluted around the outer peripheral surface of the tubular base member 13 in a state in which its surface where only the heat-resistant material 6 is exposed faces the outside, and through the compression forming in the above-described seventh process, the spherical annular base member 32 is so constructed as to be provided with structural integrity as the heat-resistant material 6 and the reinforcing member 5 are compressed to each other and intertwined with each other, such that, in the outer layer 33, the heat-resistant material 6 and the reinforcing member 5 are compressed and the heat-resistant material 6 is thereby filled in the meshes of the metal wire net of the reinforcing member 5, and the outer surface 35 of that outer layer 33 is formed into a smooth surface constituted by the heat-resistant material 6.

In the spherical annular seal member 34 thus fabricated, the heat-resistant material 6 contains expanded graphite constituting a principal component and a phosphate or a phosphate and phosphorus pentoxide.

As for the expanded graphite constituting a principal component, its graphite content (graphite purity) is not less than 99.7% by mass, preferably not less than 99.8% by mass. Further, the expanded graphite contains ash at a ratio of not more than 0.1% by mass, preferably not more than 0.05% by mass, and more preferably not more than 0.01% by mass.

The expanded graphite contains sulfur at a ratio of not more than 1700 ppm by mass, preferably more than 1000 ppm by mass, more preferably not more than 500 ppm by mass, even more preferably not more than 100 ppm by mass, and still more preferably not more than 50 ppm by mass.

The relative amount of the graphite content in the expanded graphite is related to the level of the graphite purity, so that the higher the purity is, the more characteristic of the expanded graphite is heightened. Since the graphite content in the expanded graphite is not less than 99.7% by mass, preferably not less than 99.8% by mass, this graphite content is sufficient from the viewpoints of heat resistance, sealability, and wear resistance which are required of the spherical annular seal member.

The phosphate or the phosphate and the phosphorus pentoxide which are contained in the heat-resistant material 6 exhibit oxidation inhibiting action with respect to the aforementioned expanded graphite, and the phosphate is contained in the heat-resistant material 6 at a ratio of 0.1 to 16% by mass, preferably 0.5 to 8% by mass, while the phosphorus pentoxide is contained in the heat-resistant material 6 at a ratio of 0.05 to 5% by mass, preferably 0.5 to 3% by mass.

The phosphate is selected from lithium primary phosphate ($LiH_2PO_4$), lithium secondary phosphate ($Li_2HPO_4$), calcium primary phosphate [$Ca(H_2PO_4)_2$], calcium secondary phosphate ($CaHPO_4$), aluminum primary phosphate [$Al(H_2PO_4)_3$], and aluminum secondary phosphate [$Al_2(HPO_4)_3$]. In addition, the phosphorus pentoxide is selected from orthophosphoric acid ($H_3PO_4$), metaphosphoric acid ($HPO_3$), polyphosphoric acid, specifically chain condensed phosphoric acids such as pyrophosphoric acid ($H_4P_2O_7$) and tripolyphosphoric acid ($H_5P_3O_{10}$), and polymetaphosphoric acid, specifically cyclic condensed phosphoric acids such as trimetaphosphoric acid and tetrametaphosphoric acid. The phosphorus pentoxide is generally used in the form of an aqueous solution together with an acidized graphite powder at the time of the fabrication of the expanded graphite, and each of these phosphoric acids is contained in the expanded graphite in the form of phosphorus pentoxide ($P_2O_5$) through the dehydration reaction of the phosphoric acid.

If the content of the phosphate contained in the heat-resistant material 6 is less than 0.1% by mass, the oxidation inhibiting action with respect to the expanded graphite is not sufficiently demonstrated, and if it is contained in excess of 16% by mass, any further effect of the oxidation inhibiting action is not satisfactorily demonstrated. Also, if the content of the phosphorus pentoxide is less than 0.05% by mass, the oxidation inhibiting action with respect to the expanded graphite in the heat-resistant material 6 is not sufficiently demonstrated in the same way as the aforementioned phosphate, and if it is contained in excess of 5% by mass, any further effect of the oxidation inhibiting action with respect to the expanded graphite is not satisfactorily demonstrated.

Thus, the heat-resistant material 6 for forming the spherical annular seal member 34 includes expanded graphite whose ash content is not more than 0.1% by mass, preferably not more than 0.05% by mass, and more preferably not more than 0.01% by mass and whose graphite content is not less than 99.7% by mass, preferably not less than 99.8% by mass, as well as 0.1 to 16% phosphate by mass or 0.1 to 16% phosphate by mass and 0.05 to 5% phosphorus pentoxide by mass. As such, the expanded graphite in the heat-resistant material 6 has an extremely small ash content and an extremely high graphite purity, so that the characteristics of the expanded graphite itself such as the heat resistance and the like are heightened. Additionally, the heat resistance and the like of the heat-resistant material 6 are heightened by virtue of the oxidation inhibiting action of the phosphate or the phosphate and the phosphorus pentoxide in the heat-resistant material 6 with respect to the expanded graphite.

As the reinforcing member 5, a metal wire net is used which is formed by weaving or knitting one or more fine wires including, as an iron-based wire, a stainless steel wire made of such as austenitic stainless steels SUS 304, SUS 310, and SUS 316, a ferritic stainless steel SUS 430, or an iron wire (JIS-G-3532) or a galvanized iron wire (JIS-3547), or, as a copper wire, a wire member made of a copper-nickel alloy (cupro-nickel), a copper-nickel-zinc alloy (nickel silver), brass, or beryllium copper. In terms of the diameter of the fine metal wire for forming that metal wire net, a fine metal wire whose diameter is 0.15 to 0.32 mm or thereabouts is used. In terms of the mesh size of that metal wire net, a metal wire net whose mesh size is 3 to 6 mm or thereabouts is preferably used.

As the reinforcing member 5, it is also possible to use, in addition to the above-described metal wire net, a so-called expanded metal which is formed such that slits are cut in a stainless steel sheet or a phosphor bronze sheet and are simultaneously enlarged, thereby forming regular mesh rows. In terms of the thickness of the stainless steel sheet and the phosphor bronze sheet, one whose thickness is 0.3 to 0.5 mm or thereabouts is preferably used.

In the above-described fourth process, if the tubular base member 13 is formed by convoluting the superposed assembly 12 in a state in which the reinforcing member 5 constituted by the belt-shaped metal wire net 4 is placed on the inner side, instead of convoluting the superposed assembly 12 with the heat-resistant material 6 placed on the inner side, it is possible to fabricate the spherical annular seal member 34 is which the reinforcing member 5 constituted by the metal wire net is exposed on the cylindrical inner surface 28 of the spherical annular base member 32.

Figure 14:
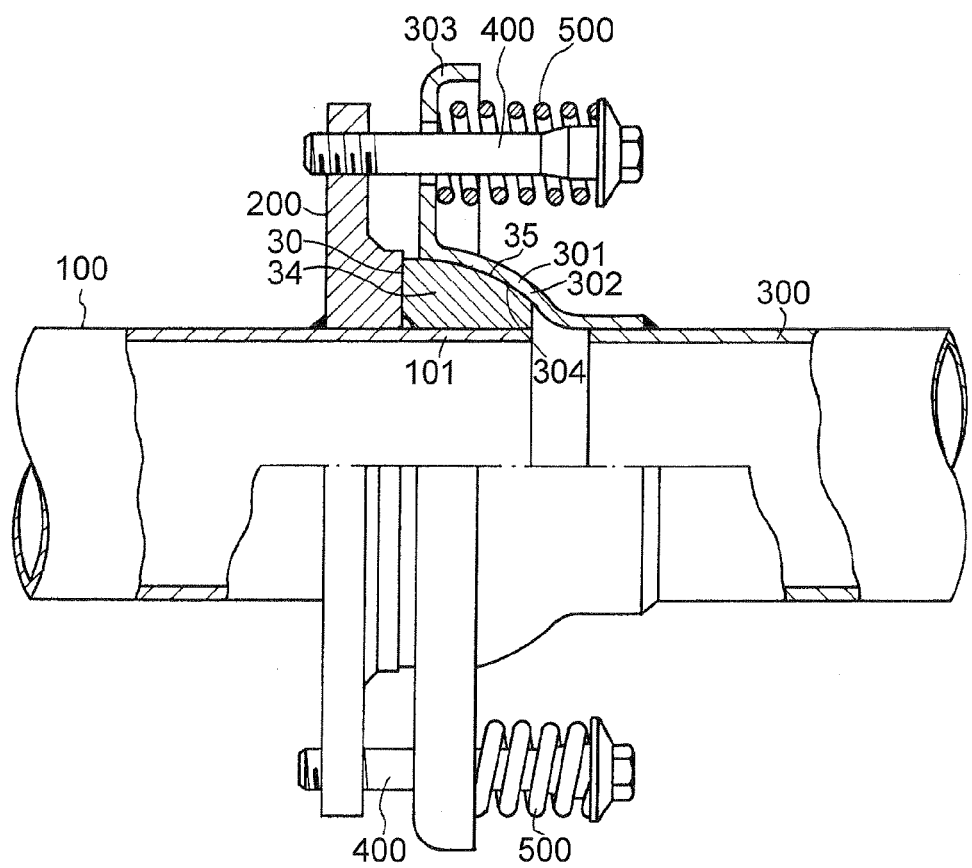
FIG. 14 is a vertical cross-sectional view of an exhaust pipe joint incorporating the spherical annular seal member in accordance with the present invention.
Figure 15:
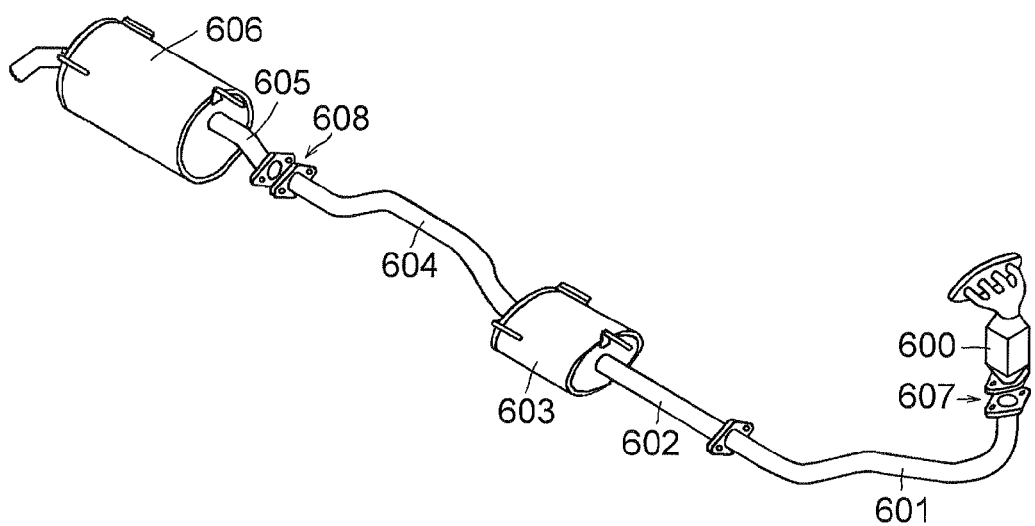
FIG. 15 is an explanatory diagram of an exhaust system of an automobile engine.

The spherical annular seal member 34 is used by being incorporated in the exhaust pipe spherical joint shown in FIG. 14. That is, in the exhaust pipe spherical joint shown in FIG. 14, a flange 200 is provided uprightly on an outer peripheral surface of an upstream-side exhaust pipe 100, which is connected to an engine, by leaving a pipe end 101. The spherical annular seal member 34 is fitted and fixed over the pipe end 101 at the cylindrical inner surface 28 defining the through hole 27, and is seated with its large-diameter side annular end face 30 abutting against that flange 200. A flared portion 301, which integrally has a concave spherical surface portion 302 and a flange portion 303 continuous from the concave spherical surface portion 302, is secured to a downstream-side exhaust pipe 300 which is disposed in such a manner as to oppose the upstream-side exhaust pipe 100 and is connected to the muffler side. An inner surface 304 of the concave spherical surface portion 302 is in sliding contact with the smooth surface 38 where the surface 36 constituted by the reinforcing member 5 and the surface 37 constituted by the heat-resistant material 6 are present in mixed form in the outer surface 35 of the outer layer 33 of the spherical annular seal member 34, or with the smooth surface 37 constituted by the heat-resistant material 6 in the outer surface 35 of the outer layer 33 of the spherical annular seal member 34.

In the exhaust pipe spherical joint shown in FIG. 14, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. Further, the exhaust pipe spherical joint is arranged such that relative angular displacements occurring in the upstream- and downstream-side exhaust pipes 100 and 300 are allowed by sliding contact between the smooth surface 38 or the smooth surface 37 serving as a sliding surface of the outer layer 33 of the spherical annular seal member 34 and the inner surface 304 of the concave spherical surface portion 302 of the flared portion 301 formed at the end of the downstream-side exhaust pipe 300.

EXAMPLES

Next, the present invention will be described in detail in accordance with examples; however, it should be noted that the present invention is not limited to these examples.

Examples 1 to 6

By using one austenitic stainless steel wire (SUS 304) having a wire diameter of 0.28 mm as a fine metal wire, a cylindrical knitted metal wire net whose mesh size was 4 mm long and 5 mm wide was fabricated and was passed between a pair of rollers to form a belt-shaped metal wire net. This metal wire net was used as the reinforcing member for the spherical annular base member.

As the heat-resistant material, an expanded graphite sheet was used in which 0.5 to 12.0% aluminum primary phosphate by mass as a phosphate was contained in expanded graphite whose ash content was 0.01% by mass and whose graphite content was 99.99% by mass, the expanded graphite sheet having a density of 1.12 $Mg/m^3$ and a thickness of 0.38 mm. After the heat-resistant material was convoluted by a one-circumference portion, the reinforcing member was superposed with the heat-resistant material placed on the inner side, and the superposed assembly thereof was convoluted, thereby preparing a tubular base member in which the heat-resistant material was located on the outermost periphery. In this tubular base member, widthwise opposite end portions of the heat-resistant material respectively projected from both widthwise ends of the reinforcing member.

A heat-resistant material similar to the above-described heat-resistant material was continuously inserted into the interior of a reinforcing member for an outer layer constituted by a cylindrical knitted metal wire net which was formed by using one fine metal wire similar to the above-described fine metal wire and whose mesh size was 3.5 mm long and 2.5 mm wide. The reinforcing member with the heat-resistant material inserted therein was fed, starting with its insertion start end, into a nip between a pair of cylindrical rollers each having a smooth cylindrical outer peripheral surface, and was pressurized in the thicknesswise direction of the heat-resistant material so as to be formed integrally and was cut into a predetermined length, thereby filling the heat-resistant material into the meshes of the metal wire net of the reinforcing member for the outer layer. Thus, a flattened outer-layer forming member was fabricated on the surface of which a surface constituted by the reinforcing member for the outer layer and a surface constituted by the heat-resistant material were exposed in mixed form.

The aforementioned outer-layer forming member was wound around the outer peripheral surface of the aforementioned tubular base member, thereby preparing a cylindrical preform. This cylindrical preform was fitted over the outer peripheral surface of the stepped core of the die, and was positioned in the hollow portion of the die.

The cylindrical perform disposed in the hollow portion of the die was subjected to compression forming at a pressure of 294 $N/mm^3$ (3 $tons/cm^2$) in the direction of the core axis, to thereby obtain spherical annular seal members of Examples 1 to 6, each of which had a through hole in its central portion and included the cylindrical inner surface and the outer layer formed integrally on the partially convex spherical surface.

By means of this compression forming, the spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.01% by mass and a graphite content of 99.99% by mass and from aluminum primary phosphate, and which filled the meshes of the metal wire net of this reinforcing member and was compressed in such a manner as to be formed integrally with the reinforcing member in mixed form. In the outer layer, the heat-resistant material with an ash content of 0.01% by mass and a graphite content of 99.99% by mass and the reinforcing member for the outer layer made from the metal wire net were compressed such that the heat-resistant material constituted of expanded graphite and aluminum primary phosphate was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 1 to 6, the reinforcing member made from the metal wire net was contained at a ratio of 57.8 to 58.1% by mass, and the heat-resistant material made from expanded graphite and aluminum primary phosphate was contained at a ratio of 41.9 to 42.2% by mass. The density of the heat-resistant material in the spherical annular base member and the outer layer was 1.62 $Mg/m^3$, and the weight of the spherical annular seal member was 40.3 to 41.0 g.

Examples 7 to 9

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 0.5% phosphorus pentoxide by mass were contained in expanded graphite with an ash content of 0.1% by mass and a graphite content of 99.9% by mass, and which had a density of 1.12 $Mg/m^3$ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.1% by mass and a graphite content of 99.9% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.1% by mass and a graphite content of 99.9% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 7 to 9, the reinforcing member made from the metal wire net was contained at a ratio of 57.5 to 58.1% by mass, and the heat-resistant material made from expanded graphite and from phosphorus pentoxide and aluminum primary phosphate was contained at a ratio of 41.9 to 42.5% by mass. The density of the heat-resistant material in the spherical annular base member and the outer layer was 1.63 Mg/m$^3$, and the weight of the spherical annular seal member was 40.3 to 41.4 g.

Examples 10 to 12

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 0.05% by mass and a graphite content of 99.95% by mass, and which had a density of 1.12 Mg/m$^3$ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.05% by mass and a graphite content of 99.95% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.05% by mass and a graphite content of 99.95% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 10 to 12, the reinforcing member made from the metal wire net was contained at a ratio of 57.9 to 58.2% by mass, and the heat-resistant material made from expanded graphite and from phosphorus pentoxide and aluminum primary phosphate was contained at a ratio of 41.8 to 42.1% by mass. The density of the heat-resistant material in the spherical annular base member and the outer layer was 1.62 Mg/m$^3$, and the weight of the spherical annular seal member was 40.2 to 40.9 g.

Examples 13 to 15

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 0.01% by mass and a graphite content of 99.99% by mass, and which had a density of 1.12 Mg/m$^3$ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.01% by mass and a graphite content of 99.99% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.01% by mass and a graphite content of 99.99% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 13 to 15, the reinforcing member made from the metal wire net was contained at a ratio of 56.6 to 58.4% by mass, and the heat-resistant material made from expanded graphite and from phosphorus pentoxide and aluminum primary phosphate was contained at a ratio of 41.6 to 43.3% by mass. The density of the heat-resistant material in the spherical annular base member and the outer layer was 1.61 Mg/m$^3$, and the weight of the spherical annular seal member was 40.9 to 41.3 g.

Examples 16 to 18

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 0.1% by mass, a sulfur content of 1000 ppm by mass (0.1% by mass), and a graphite content of 99.8% by mass, and which had a density of 1.12 Mg/m³ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.1% by mass, a sulfur content of 1000 ppm by mass, and a graphite content of 99.8% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.1% by mass, a sulfur content of 1000 ppm by mass, and a graphite content of 99.8% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 16 to 18, the reinforcing member made from the metal wire net was contained at a ratio of 57.5 to 58.1% by mass, and the heat-resistant material made from expanded graphite and from phosphorus pentoxide and aluminum primary phosphate was contained at a ratio of 41.9 to 42.5% by mass. The density of the heat-resistant material in the spherical annular base member and the outer layer was 1.62 Mg/m³, and the weight of the spherical annular seal member was 40.3 to 40.9 g.

Examples 19 to 21

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 0.01% by mass, a sulfur content of 200 ppm by mass (0.02% by mass), and a graphite content of 99.97% by mass, and which had a density of 1.12 Mg/m³ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.01% by mass, a sulfur content of 200 ppm by mass, and a graphite content of 99.97% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.01% by mass, a sulfur content of 200 ppm by mass, and a graphite content of 99.97% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 19 to 21, the reinforcing member made from the metal wire net was contained at a ratio of 57.4 to 58.1% by mass, and the heat-resistant material made from expanded graphite and from phosphorus pentoxide and aluminum primary phosphate was contained at a ratio of 41.9 to 42.6% by mass. The density of the heat-resistant material in the spherical annular base member and the outer layer was 1.62 Mg/m³, and the weight of the spherical annular seal member was 40.3 to 40.8 g.

Examples 22 to 24

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 0.01% by mass, a sulfur content of 50 ppm by mass (0.005% by mass), and a graphite content of 99.985% by mass, and which had a density of 1.12 Mg/m³ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 0.01% by mass, a sulfur content of 50 ppm by mass (0.005% by mass), and a graphite content of 99.985% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 0.01% by mass, a sulfur content of 50 ppm by mass (0.005% by mass), and a graphite content of 99.985% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Examples 22 to 24, the reinforcing member made from the metal wire net was contained at a ratio of 57.1 to 58.1% by mass, and the heat-resistant material made from expanded graphite and from phosphorus pentoxide and aluminum primary phosphate was contained at a ratio of 41.9 to 42.9% by mass. The density of the heat-resistant material in the spherical annular base member and the outer layer was 1.62 Mg/m$^3$, and the weight of the spherical annular seal member was 40.3 to 41.0 g.

Comparative Examples 1 to 3

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 2.80% by mass, a sulfur content of 1200 ppm by mass (0.12% by mass), and a graphite content of 97.08% by mass, and which had a density of 1.12 Mg/m$^3$ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 2.80% by mass, a sulfur content of 1200 ppm by mass, and a graphite content of 97.08% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 2.8% by mass, a sulfur content of 1200 ppm by mass, and a graphite content of 97.08% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Comparative Examples 1 to 3, the reinforcing member made from the metal wire net was contained at a ratio of 57.9 to 58.1% by mass, and the heat-resistant material made from expanded graphite and from phosphorus pentoxide and aluminum primary phosphate was contained at a ratio of 41.9 to 42.1% by mass. The density of the heat-resistant material in the spherical annular base member and the outer layer was 1.62 Mg/m$^3$, and the weight of the spherical annular seal member was 40.3 to 40.8 g.

Comparative Examples 4 to 6

As the reinforcing member, a reinforcing member for a spherical annular base member and a reinforcing member for an outer layer which were similar to those of the above-described Example 1 were used.

As the heat-resistant material, an expanded graphite sheet was used in which 1.0 to 8.0% aluminum primary phosphate by mass as a phosphate and 1.0% phosphorus pentoxide by mass were contained in expanded graphite with an ash content of 1.0% by mass, a sulfur content of 1000 ppm by mass (0.1% by mass), and a graphite content of 98.9% by mass, and which had a density of 1.12 Mg/m$^3$ and a thickness of 0.38 mm. Then, the following spherical annular seal members were fabricated by using a method similar to that of the above-described Example 1. The spherical annular base member was constructed so as to be provided with structural integrity as the heat-resistant material and the reinforcing member for the spherical annular base member made from the metal wire net were compressed and intertwined with each other. The spherical annular base member included the reinforcing member for the spherical annular base member made from the compressed metal wire net and the heat-resistant material which was made from expanded graphite with an ash content of 1.0% by mass, a sulfur content of 1000 ppm by mass, and a graphite content of 98.9% by mass as well as aluminum primary phosphate and phosphorus pentoxide, and which filled the meshes of the metal wire net of this reinforcing member and was compressed in such a manner as to be formed integrally with the reinforcing member in mixed form. In the outer layer, the heat-resistant material made from expanded graphite with an ash content of 1.0% by mass, a sulfur content of 1000 ppm by mass, and a graphite content of 98.9% by mass as well as aluminum primary phosphate and phosphorus pentoxide and the reinforcing member for the outer layer made from the metal wire net were compressed such that the heat-resistant material was filled in the meshes of the metal wire net of the reinforcing member and the heat-resistant material and the reinforcing member were integrated in mixed form. The outer surface of that outer layer was formed into a smooth surface where the surface constituted by the reinforcing member and the surface constituted by the heat-resistant material were present in mixed form.

In the fabricated spherical annular base member and outer layer in Comparative Examples 4 to 6, the reinforcing member made from the metal wire net was contained at a ratio of 58.1% by mass, and the heat-resistant material made from expanded graphite and from phosphorus pentoxide and aluminum primary phosphate was contained at a ratio of 41.9% by mass. The density of the heat-resistant material in the spherical annular base member and the outer layer was 1.62 Mg/m$^3$, and the weight of the spherical annular seal member was 40.3 to 41.0 g.

A description will be given of the results of tests conducted on the oxidation loss (amount of weight reduction) and the amount of gas leakage (l/min) of the spherical annular seal member by incorporating the spherical annular seal members obtained in Examples and Comparative Examples described above into the exhaust pipe spherical joint shown in FIG. 14.

<Test Conditions of Gas Leakage Amount>
  Pressing force using coil springs (spring set force): 980 N
  Oscillation angle: ±2.5°
  Excitation frequency (oscillation velocity): 5 Hz
  Temperature (outer surface temperature of the concave spherical surface portion 302 shown in FIG. 14):
    from room temperature (25° C.) to 700° C.
  Number of oscillating motions: 1,000,000
  Mating member (material of the flared portion 301 shown in FIG. 14):
    SUS 304
<Test Method>
  The temperature is raised up to 700° C. while continuing the oscillating motion at ±2.5° at an excitation frequency of 5 Hz at room temperature (25° C.). In a state in which that temperature is held, the oscillating motion is continued, and the amount of gas leakage is measured at the point of time when the number of oscillating motions reached 1,000,000.
<Measurement Method of Gas Leakage Amount>
  An opening of the one exhaust pipe 100 of the exhaust pipe spherical joint shown in FIG. 14 is closed, and dry air is allowed to flow from the other exhaust pipe 300 side under a pressure of 0.049 Mpa (0.5 kgf/cm$^2$). The amount of gas leakage from the joint portion (sliding contact portions between the outer surface 35 of the spherical annular seal member 34 and the flared portion 301, fitting portions between the cylindrical inner surface 28 of the spherical annular seal member 34 and the pipe end portion 101 of the exhaust pipe 100, and abutting portions between the large-diameter side annular end face 30 and the flange 200 provided uprightly on the exhaust pipe 100) is measured by means of a flowmeter four times, i.e., (1) at an early period of test, (2) after 250,000 oscillating motions, (3) after 500,000 oscillating motions, and (4) after 1,000,000 oscillating motions.

The oxidation loss of the spherical annular seal member was evaluated in terms of the rate of weight reduction by measuring the weight of the spherical annular seal member before starting the above-described test and the weight of the spherical annular seal member after the test (after completion of 1,000,000 oscillating motions).

Tables 1 to 4 show the test results of the spherical annular seal members of Examples 1 to 24, and Table 5 shows the test results of the spherical annular seal members of Comparative Examples 1 to 6.

TABLE 1

|  |  | Examples | | | | | |
| --- | --- | --- | --- | --- | --- | --- | --- |
|  |  | 1 | 2 | 3 | 4 | 5 | 6 |
| Heat-resistant Material: | | | | | | | |
| Expanded graphite | Graphite content | 99.99 | 99.99 | 99.99 | 99.99 | 99.99 | 99.99 |
|  | Ash content | | | | 0.01 | | |
|  | Sulfur content | — | — | — | — | — | — |
| Expanded graphite | | 99.5 | 99.0 | 96.0 | 92.0 | 90.0 | 88.0 |
| Phosphorus pentoxide | | — | — | — | — | — | — |
| Phosphate | | 0.5 | 1.0 | 4.0 | 8.0 | 10.0 | 12.0 |
| Spherical Annular Seal Member: | | | | | | | |
| Weight before test (g) | | 40.3 | 40.3 | 40.4 | 40.4 | 40.8 | 41.0 |
| Weight after test (g) | | 37.9 | 37.9 | 38.3 | 38.3 | 38.4 | 38.8 |
| Weight reduction rate (%) | | 6.0% | 6.0% | 5.2% | 5.2% | 5.9% | 5.8% |
| Amount of gas leakage | 1 | 0.06 | 0.06 | 0.05 | 0.05 | 0.05 | 0.05 |
|  | 2 | 0.12 | 0.10 | 0.12 | 0.14 | 0.14 | 0.14 |
|  | 3 | 0.18 | 0.18 | 0.16 | 0.16 | 0.18 | 0.18 |
|  | 4 | 0.36 | 0.35 | 0.32 | 0.32 | 0.33 | 0.35 |

TABLE 2

|  |  | Examples | | | | | |
| --- | --- | --- | --- | --- | --- | --- | --- |
|  |  | 7 | 8 | 9 | 10 | 11 | 12 |
| Heat-resistant Material: | | | | | | | |
| Expanded graphite | Graphite content | 99.9 | 99.9 | 99.9 | 99.95 | 99.95 | 99.95 |
|  | Ash content | | 0.1 | | | 0.05 | |
|  | Sulfur content | — | — | — | — | — | — |
| Expanded graphite | | 99.0 | 96.0 | 92.0 | 99.0 | 96.0 | 92.0 |
| Phosphorus pentoxide | | — | 0.5 | — | — | 1.0 | — |
| Phosphate | | 1.0 | 4.0 | 8.0 | 1.0 | 4.0 | 8.0 |
| Spherical Annular Seal Member: | | | | | | | |
| Weight before test (g) | | 40.3 | 41.0 | 41.4 | 40.2 | 40.6 | 40.9 |
| Weight after test (g) | | 37.9 | 38.8 | 39.1 | 38.2 | 38.6 | 38.8 |
| Weight reduction rate (%) | | 6.0% | 5.4% | 5.5% | 5.0% | 5.0% | 5.0% |
| Amount of gas leakage | 1 | 0.06 | 0.05 | 0.05 | 0.05 | 0.05 | 0.05 |
|  | 2 | 0.10 | 0.12 | 0.12 | 0.10 | 0.12 | 0.12 |
|  | 3 | 0.18 | 0.20 | 0.20 | 0.16 | 0.16 | 0.18 |
|  | 4 | 0.36 | 0.36 | 0.36 | 0.30 | 0.28 | 0.32 |

TABLE 3

| | | Examples | | | | | |
|---|---|---|---|---|---|---|---|
| | | 13 | 14 | 15 | 16 | 17 | 18 |
| Heat-resistant Material: | | | | | | | |
| Expanded graphite | Graphite content | 99.99 | 99.99 | 99.99 | 99.8 | 99.8 | 99.8 |
| | Ash content | | 0.01 | | | 0.1 | |
| | Sulfur content | — | — | — | | 0.1 | |
| Expanded graphite | | 99.0 | 96.0 | 92.0 | 98.0 | 95.0 | 91.0 |
| Phosphorus pentoxide | | | 1.0 | | | 1.0 | |
| Phosphate | | 1.0 | 4.0 | 8.0 | 1.0 | 4.0 | 8.0 |
| Spherical Annular Seal Member: | | | | | | | |
| Weight before test (g) | | 41.3 | 40.9 | 41.0 | 40.3 | 40.6 | 40.9 |
| Weight after test (g) | | 39.7 | 39.5 | 39.5 | 38.0 | 38.4 | 38.7 |
| Weight reduction rate (%) | | 4.0% | 3.5% | 3.8% | 5.7% | 5.4% | 5.5% |
| Amount of gas leakage | 1 | 0.06 | 0.04 | 0.05 | 0.06 | 0.05 | 0.05 |
| | 2 | 0.08 | 0.05 | 0.06 | 0.10 | 0.12 | 0.12 |
| | 3 | 0.14 | 0.10 | 0.12 | 0.18 | 0.18 | 0.20 |
| | 4 | 0.24 | 0.16 | 0.18 | 0.36 | 0.34 | 0.36 |

TABLE 4

| | | Examples | | | | | |
|---|---|---|---|---|---|---|---|
| | | 19 | 20 | 21 | 22 | 23 | 24 |
| Heat-resistant Material: | | | | | | | |
| Expanded graphite | Graphite content | 99.97 | 99.97 | 99.97 | 99.985 | 99.985 | 99.985 |
| | Ash content | | 0.01 | | | 0.01 | |
| | Sulfur content | | 0.02 | | | 0.005 | |
| Expanded graphite | | 98.0 | 95.0 | 92.0 | 98.0 | 95.0 | 91.0 |
| Phosphorus pentoxide | | | 1.0 | | | 1.0 | |
| Phosphate | | 1.0 | 4.0 | 8.0 | 1.0 | 4.0 | 8.0 |
| Spherical Annular Seal Member: | | | | | | | |
| Weight before test (g) | | 40.8 | 40.3 | 40.3 | 41.0 | 40.3 | 40.8 |
| Weight after test (g) | | 39.0 | 38.6 | 38.6 | 39.4 | 38.9 | 39.3 |
| Weight reduction rate (%) | | 4.4% | 4.2% | 4.2% | 4.0% | 3.5% | 3.7% |
| Amount of gas leakage | 1 | 0.06 | 0.05 | 0.06 | 0.05 | 0.04 | 0.05 |
| | 2 | 0.08 | 0.08 | 0.10 | 0.06 | 0.05 | 0.06 |
| | 3 | 0.14 | 0.14 | 0.16 | 0.12 | 0.10 | 0.12 |
| | 4 | 0.24 | 0.22 | 0.24 | 0.18 | 0.16 | 0.18 |

TABLE 5

| | | Comparative Examples | | | | | |
|---|---|---|---|---|---|---|---|
| | | 1 | 2 | 3 | 4 | 5 | 6 |
| Heat-resistant Material: | | | | | | | |
| Expanded graphite | Graphite content | 97.08 | 97.08 | 97.08 | 98.9 | 98.9 | 98.9 |
| | Ash content | | 2.80 | | | 1.0 | |
| | Sulfur content | | 0.12 | | | 0.1 | |
| Expanded graphite | | 98.0 | 95.0 | 91.0 | 98.0 | 95.0 | 91.0 |
| Phosphorus pentoxide | | | 1.0 | | | 1.0 | |
| Phosphate | | 1.0 | 4.0 | 8.0 | 1.0 | 4.0 | 8.0 |
| Spherical Annular Seal Member: | | | | | | | |
| Weight before test (g) | | 40.8 | 40.3 | 40.3 | 41.0 | 40.3 | 40.8 |
| Weight after test (g) | | 35.2 | 35.2 | 35.1 | 36.8 | 36.4 | 36.6 |
| Weight reduction rate (%) | | 13.7% | 12.7% | 12.9% | 10.2% | 9.7% | 10.3% |
| Amount of gas leakage | 1 | 0.05 | 0.05 | 0.05 | 0.05 | 0.05 | 0.06 |
| | 2 | 0.22 | 0.18 | 0.18 | 0.16 | 0.12 | 0.14 |
| | 3 | 0.34 | 0.30 | 0.28 | 0.26 | 0.28 | 0.28 |
| | 4 | 0.73 | 0.68 | 0.68 | 0.48 | 0.42 | 0.44 |

In the spherical annular seal members of Examples 1 to 24 shown in Tables 1 to 4, the weight reduction rate of the spherical annular seal member due to oxidative wear was 6.0% or less even under the high temperature condition of the 700° C. test temperature. Particularly in the spherical annular seal members of Examples 13 to 15 or Examples 22 to 24 which used the heat-resistant material in which 1 to 8% phosphate by mass and 1% phosphorus pentoxide by mass were contained in expanded graphite with an ash content of 0.01% by mass and a graphite content of not less than 99.9% by mass or in expanded graphite with an ash content of 0.01% by mass, a sulfur content of 0.005% by mass (50 ppm by mass), and a graphite content of not less than 99.9% by mass, the weight reduction rate of the spherical annular seal member due to oxidative wear exhibited an extremely low value of 4.0% or less even under the high temperature condition of the 700° C. test temperature. In addition, also in the amount of gas leakage (sealability) of the spherical annular seal member ascribable to the weight reduction, the spherical annular seal members in Examples 1 to 24 showed values which were one-half or less of the amount of gas leakage of the spherical annular seal members in Comparative Examples, and thus showed results which excelled over the spherical annular seal members of Comparative Examples.

From the above-described test results, it was found that the relative quality of the heat resistance of the expanded graphite itself is determined by the relative amount of the content of ash contained in expanded graphite in the heat-resistant material, and that the effect on heat resistance is heightened most when the content of ash contained in expanded graphite is not more than 0.1% by mass, most preferably not more than 0.01% by mass (including zero).

As described above, the spherical annular seal member in accordance with the present invention is capable of reducing the amount of weight reduction ascribable to oxidative wear even in the use at a high-temperature region, and improves the degree of sealability (ascribable to the weight reduction of the spherical annular seal member) occurring at sliding contact portions between the outer surface of the outer layer of the spherical annular seal member and the inner surface of the concave spherical surface portion of the flared portion of the exhaust pipe and at abutting portions between the large-diameter side annular end face of the spherical annular seal member and the flange provided uprightly on the exhaust pipe, thereby making it possible to reduce the amount of gas leakage from the relevant portions.

DESCRIPTION OF REFERENCE NUMERALS

4: belt-shaped metal wire net
5: reinforcing member
6: heat-resistant material
12: superposed assembly
13: tubular base member
18: outer-layer forming member
19: cylindrical perform
26: die
28: cylindrical inner surface
29: partially convex spherical surface
30: large-diameter side annular end face
31: small-diameter side annular end face
32: spherical annular base member
33: outer layer
34: spherical annular seal member

The invention claimed is:

1. A spherical annular seal member for use in an exhaust pipe joint comprising: a spherical annular base member defined by a cylindrical inner surface, a partially convex spherical surface, and large- and small-diameter side annular end faces of said partially convex spherical surface; and an outer layer formed integrally on said partially convex spherical surface of said spherical annular base member, wherein said spherical annular base member includes a reinforcing member made from a metal wire net and a heat-resistant material containing expanded graphite at a ratio of 88.0 to 99.5% by mass and at least a phosphate at a ratio of 0.5 to 12% by mass and compressed in such a manner as to fill meshes of the metal wire net of said reinforcing member and to be integrated with said reinforcing member in mixed form, and said outer layer includes a heat-resistant material containing expanded graphite at a ratio of 88.0 to 99.5% by mass and at least a phosphate at a ratio of 0.5 to 12% by mass and a reinforcing member made from a metal wire net integrated with said heat-resistant material in mixed form, the expanded graphite in said heat-resistant material having an ash content of not more than 0.1% by mass and a graphite content of not less than 99.8% mass.

2. The spherical annular seal member according to claim 1, wherein the expanded graphite in said heat-resistant material has an ash content of not more than 0.01% by mass.

3. The spherical annular seal member according to claim 1, wherein the expanded graphite in said heat-resistant material contains sulfur at a ratio of not more than 0.17% by mass (not more than 1700 ppm by mass).

4. The spherical annular seal member according to claim 1, wherein the expanded graphite in said heat-resistant material contains sulfur at a ratio of not more than 0.1% by mass (not more than 1000 ppm by mass).

5. The spherical annular seal member according to claim 1, wherein the expanded graphite in said heat-resistant material contains sulfur at a ratio of not more than 0.01% by mass (not more than 100 ppm by mass).

6. The spherical annular seal member according to claim 1, wherein the expanded graphite in said heat-resistant material contains sulfur at a ratio of not more than 0.005% by mass (not more than 50 ppm by mass).

7. The spherical annular seal member according to claim 1, wherein said heat-resistant material contains phosphorus pentoxide at a ratio of 0.05 to 5% by mass.

8. The spherical annular seal member according to claim 1, wherein an outer surface of said outer layer is formed into a smooth surface of said heat-resistant material in which the expanded graphite and the phosphate are contained.

9. The spherical annular seal member according to claim 1, wherein an outer surface of said outer layer is formed into a smooth surface of said heat-resistant material in which the expanded graphite, the phosphate, and the phosphorus pentoxide are contained.

10. The spherical annular seal member according to claim 1, wherein an outer surface of said outer layer is formed into a smooth surface in which a surface constituted by said reinforcing member and a surface constituted by said heat-resistant material containing the expanded graphite and the phosphate are present in mixed form.

11. The spherical annular seal member according to claim 1, wherein an outer surface of said outer layer is formed into a smooth surface in which a surface constituted by said reinforcing member and a surface constituted by said heat-resistant material containing the expanded graphite, the phosphate, and the phosphorus pentoxide are present in mixed form.

12. The spherical annular seal member according to claim 1, wherein the expanded graphite in said heat-resistant material has an ash content of not more than 0.05% by mass.

* * * * *